US 9,552,421 B2

(12) United States Patent
Crook et al.

(10) Patent No.: US 9,552,421 B2
(45) Date of Patent: Jan. 24, 2017

(54) SIMPLIFIED COLLABORATIVE SEARCHING THROUGH PATTERN RECOGNITION

(71) Applicant: Microsoft Corporation, Redmond, WA (US)

(72) Inventors: Aidan C. Crook, Bellevue, WA (US); Avneesh Sud, Kirkland, WA (US); Xiaoyuan Cui, Sammamish, WA (US); Ohil K. Manyam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 13/833,441

(22) Filed: Mar. 15, 2013

(65) Prior Publication Data
US 2014/0280299 A1 Sep. 18, 2014

(51) Int. Cl.
*G06F 17/30* (2006.01)
(52) U.S. Cl.
CPC .............................. *G06F 17/30864* (2013.01)
(58) Field of Classification Search
CPC ................................................ G06F 17/30867
USPC ........ 707/705, 706; 382/181, 118; 340/5.53, 340/5.83
See application file for complete search history.

(56) References Cited

U.S. PATENT DOCUMENTS 9,183,464 B1 * 11/2015 Huang ................. G06K 9/6259
9,213,420 B2 * 12/2015 Amacker .............. G06F 3/0304
2006/0235873 A1 * 10/2006 Thomas ........................ 707/102
2007/0226183 A1 9/2007 Hart et al.
2008/0005067 A1 1/2008 Dumais et al.
2009/0110248 A1 * 4/2009 Masuda et al. ............... 382/118
(Continued)

OTHER PUBLICATIONS

Arapakis, et al., "Integrating Facial Expressions into User Profiling for the Improvement of a Multimodal Recommender System", Retrieved at <<http://www.slis.tsukuba.ac.jp/~hideo/_media/pub/icme09/icme09.pdf>>, In Proceedings of the IEEE International Conference on Multimedia and Expo, Jun. 28, 2009, pp. 4.
(Continued)

*Primary Examiner* — Baoquoc N To
(74) *Attorney, Agent, or Firm* — Jessica Meyers; Sandy Swain; Micky Minhas

(57) ABSTRACT

Simplified collaborative searching is provided by pattern recognition such as facial recognition, motion recognition, and the like to provide handsfree functionality. Users join a collaborative search by placing themselves within the field of view of a camera communicationally coupled to a computing device that performs facial recognition and identifies the users, thereby adding them to the collaboration. Users also join by performing simple movements with a portable computing device, such as the ubiquitous mobile phone. A collaboration component tracks the users in the collaboration and identifies them to a search engine, thereby enabling the search engine to perform a collaborative search. The collaboration component also disseminates the collaborative recommendations, either automatically or based upon explicit requests triggered by pattern recognition, including motion recognition and touch recognition. The collaboration component can utilize heuristics to identify individual collaborative sessions, or can utilize existing collaborative infrastructure.

20 Claims, 6 Drawing Sheets

(56) References Cited

U.S. PATENT DOCUMENTS

| | | | |
|---|---|---|---|
| 2009/0307205 A1* | 12/2009 | Churchill | G06F 17/30867 |
| 2010/0005061 A1* | 1/2010 | Basco | G06F 17/3071 |
| | | | 704/9 |
| 2010/0057726 A1* | 3/2010 | Ma et al. | 707/5 |
| 2010/0153413 A1 | 6/2010 | Mok et al. | |
| 2010/0205190 A1 | 8/2010 | Morris et al. | |
| 2011/0196864 A1 | 8/2011 | Mason et al. | |
| 2012/0314962 A1 | 12/2012 | Holland et al. | |
| 2013/0173569 A1* | 7/2013 | Pearcy | 707/706 |
| 2014/0025737 A1* | 1/2014 | Kruglick | H04L 67/22 |
| | | | 709/204 |

OTHER PUBLICATIONS

Zhen, et al., "Rapid Face Image Retrieval with Pose-based Local Features and Multi-reference Re-ranking", Retrieved at <<http://www.jofcis.com/publishedpapers/2013_9_1_223_230.pdf>>, In Journal of Computational Information Systems, Jan. 1, 2013, pp. 8.

Burghardt, et al., "Collaborative Search and User Privacy: How Can They Be Reconciled?", Retrieved at <<http://dbis.ipd.uni-karlsruhe.de/download/Collaborative_Search_and_User_Privacy.pdf>>, In Proceedings of the 4th International Conference on Collaborative Computing, Nov. 13, 2008, pp. 15.

Fernandez-Luna, et al., "User Intent Transition for Explicit Collaborative Search through Groups Recommendation", Retrieved at <<http://cis2011.fxpal.com/wp-content/uploads/2011/08/cir11userit_v6.pdf>>, Proceedings of the 3rd International Workshop on Collaborative Information Retrieval, Oct. 28, 2011, pp. 6.

Morris, et al., "Search on Surfaces: Exploring the Potential of Interactive Tabletops for Collaborative Search Tasks", Retrieved at <<http://research.microsoft.com/en-us/um/people/merrie/papers/ipm_surface_search.pdf>>, In Journal of Information Processing and Management, vol. 46, Issue 5, Nov. 5, 2009, pp. 16.

Wu, et al., "Scalable Face Image Retrieval with Identity-Based Quantization and Multi-Reference Re-ranking", Retrieved at <<http://research.microsoft.com/pubs/122158/cvpr2010.pdf>>, In the Twenty-Third IEEE Conference on Computer Vision and Pattern Recognition, Jun. 13, 2010, pp. 8.

"Microsoft FaceSDK", Retrieved at <<http://research.microsoft.com/en-us/projects/facesdk/>>, Retrieved Date: Mar. 7, 2013, pp. 2.

"Search User Interface Using Outward Physical Expressions", U.S. Appl. No. 13/570,229, filed Aug. 8, 2012, pp. 40.

"International Search Report & Written Opinion for PCT Patent Application No. PCT/US2014/026936", Mailed Date: Nov. 13, 2014, 9 Pages.

* cited by examiner

SIMPLIFIED COLLABORATIVE SEARCHING THROUGH PATTERN RECOGNITION

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Such information is often marked, or "tagged", in such a manner that it can be found, identified and indexed by services known as "search engines". Even information that is not optimized for search engine indexing can still be located by services, associated with search engines, which seek out information available through network communications with other computing devices and enable a search engine to index such information for subsequent retrieval.

Due to the sheer volume of information that is available to computing devices through such network communicational connections with other computing devices, users increasingly turn to search engines to find the information they seek. Search engines typically enable users to search for any topic and retrieve, from this vast volume of information, identifications of specific content that is deemed to be responsive to, or associated with, the users' queries. To sort through the vast amounts of information that is available, and timely provide useful responses to users' queries, search engines employ a myriad of mechanisms to optimize the identification and retrieval of responsive and associated information.

One mechanism employed by search engines to increase the chances of providing relevant content in response to users' queries is to collect contextual information from the users submitting the queries. For example, a search engine can utilize the immediately preceding search queries submitted by a user to gain a better understanding of what the user is looking for, or to more accurately glean the user's intentions. A user model can also be built from other user-centric data that the user provides access to, such as their social network information, their computing device information and the like. Search engines also enable users to establish user identities through which users can explicitly indicate specific preferences, attributes and other like information. For example, users can specify a level of filtering to be applied to avoid receiving potentially offensive content. As another example, users can specify geographic location preferences such that searches for physical entities can be limited to particular geographic regions that are relevant to the user.

The ubiquitous network communication connections between computing devices also enable users to interoperate with one another more efficiently than previously possible. One such interoperation of users is in the context of searching, where multiple users can perform a collaborative search. A search engine, upon receiving a search query of a collaborative search, can seek to identify responsive information that is tailored to the multiple users performing the collaborative search. For example, if one user performing a collaborative search had specified a particular geographic region in their user profile, and another user in that same collaborative search had specified a different geographic region in their user profile, the search engine could seek to identify responsive information associated with the intersection of the geographic areas specified by the users performing the collaborative search.

SUMMARY

In one embodiment, users can join a collaboration and perform a collaborative search through pattern recognition, including facial recognition, motion recognition, touch recognition, voice recognition and other like pattern recognition. Such pattern recognition can enable users to join the collaboration and perform a collaborative search more efficiently, such as in a "handsfree" manner that does not require the user to manually enter information through a keyboard or other like entry mechanism, and can, thereby, make collaborative searching more appealing to users.

In another embodiment, users can request to receive collaborative recommendations, resulting from collaborative searches, through pattern recognition, including facial recognition, motion recognition, touch recognition and other like pattern recognition. Such pattern recognition can enable users to more easily receive collaborative recommendations, thereby making collaborative searching more appealing to users.

In a further embodiment, a collaboration component can establish individual collaborative sessions and can keep track of the individual users joining or leaving a particular collaborative session. When a collaborative search is made, the collaboration component can provide identification of the individual users in the collaboration to the search engine, thereby enabling the search engine to perform a collaborative search in accordance with the specified preferences, attributes and other like information present in the user profiles of the identified users.

In a still further embodiment, a collaboration component can receive requests for the collaborative recommendations, or can receive requests to transmit the recommendations to other users and can, in response to those requests, perform the requested actions. As indicated previously, such requests can be triggered by pattern recognition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
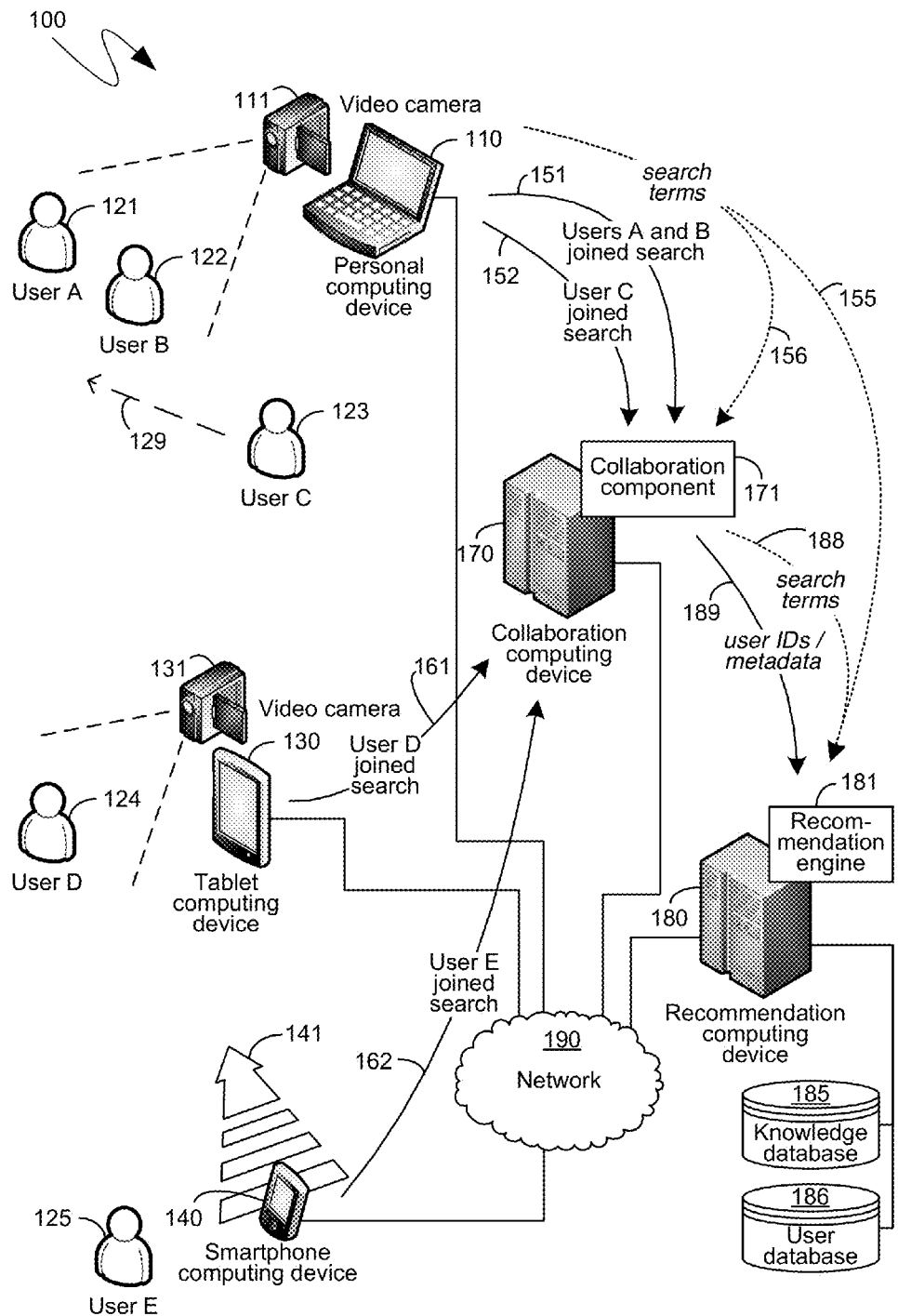
FIG. 1 is a block diagram of an exemplary system for providing simplified collaborative searching through pattern recognition.

The following description relates to the provision of simplified collaborative searching through the use of pattern recognition, including facial recognition, voice recognition, motion recognition, touch recognition and other like pattern recognition, thereby enabling users to perform collaborative searching in a "handsfree" manner. Users can join a collaborative search by placing themselves within the field of view of a camera communicationally coupled to a computing device that can perform facial recognition and identify the users, thereby adding the users to the collaboration. Users can also join a collaborative search by performing simple movements with a portable computing device, such as the ubiquitous mobile phone. A collaboration component can track the users currently in the collaboration and can provide identification of such users to a recommendation engine, such as the ubiquitous search engine, thereby enabling the recommendation engine to perform a collaborative search. The collaboration component can also disseminate the resulting collaborative recommendations, either automatically or based upon explicit requests, the latter of which can be triggered by pattern recognition including motion recognition and touch recognition. The collaboration component can utilize heuristics to identify individual collaborative sessions, or can utilize existing collaborative infrastructure, such as infrastructure provided by existing collaboration technologies.

For purposes of illustration, the techniques described herein are directed to specific types of pattern recognition, such as facial recognition, voice recognition, motion recognition and touch recognition, which are utilized to enable users to perform actions in a "handsfree", and, thus, more efficient, manner. As utilized herein, the term "handsfree" means the performance of an action without manual data entry through a keyboard or mouse. Furthermore, references to specific types of pattern recognition are strictly exemplary and are not intended to limit the mechanisms described to the specific examples provided. Indeed, the techniques described are applicable to any user input that is made easier for the user by pattern recognition. Consequently, references below to facial recognition, voice recognition, motion recognition, touch recognition and other specific types of pattern recognition should be understood to encompass other forms of pattern recognition, to the extent that such other forms of pattern recognition would similarly aid the user in the task being performed, such as by enabling the user to perform the task in a handsfree manner.

Additionally, the techniques described herein are directed to the collaborative use of a recommendation engine. The term "recommendation engine", as utilized herein, means any system that identifies information that is responsive to a query from among data previously gathered from multiple independent sources. The well-known Internet search engine is one example of such a recommendation engine, but the term "recommendation engine", as utilized herein, and explicitly defined herein, is not limited to only Internet search engines. The input to such a recommendation engine will be referred to herein as "search terms", since such input defines what recommendations are being "searched for". While such search terms can be spoken language words, as would traditionally be provided as input to an Internet search engine, the phrase "search terms", as utilized herein, is not meant to be so limited, and, instead, also includes operators, operands, expressions and other like non-linguistic input. Similarly, the act of utilizing such a recommendation engine will be referred to as "searching" or performing a "search", but, again, such an action is not limited to only Internet searching and is, instead, intended to refer to any utilization of a recommendation engine to obtain recommendations responsive to the search terms entered.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100, providing context for the descriptions below, is shown. The exemplary system 100 can comprise multiple computing devices that can be communicationally coupled to one another via the network 190. For example, exemplary system 100 includes a personal computing device 110, a tablet computing device 130, and a smartphone computing device 140, as well as a collaboration computing device 170 and a recommendation computing device 180, all communicationally coupled to one another via the network 190. In the exemplary system 100 of FIG. 1, the personal computing device 110 can include a video camera 111, which can be a physically separate peripheral communicationally coupled to the personal computing device 110, or can be integrated into the hardware of the personal computing device 110. Additionally, while the personal computing device 110 is illustrated in the exemplary system 100 of FIG. 1 as a laptop computing device, other personal computing devices are equally capable of performing the mechanisms described below including, for example, desktop computing devices, thin client computing devices, convertible computing devices, hybrid computing devices and other like personal computing devices. Similarly, the tablet computing device 130 can also comprise a video camera 131, which can be a physically separate peripheral that is communicationally coupled to the tablet computing device 130, but, more commonly, will be integrated into the tablet computing device 130. Again, as in the case of the personal computing device 110, the tablet computing device 130 is illustrated by way of example to provide context for the descriptions below, and any computing device capable of performing the mechanisms described below can be equally utilized.

Users seeking to perform a collaborative search can either be physically co-located, such as the exemplary users 121 and 122, or be remotely located, such as exemplary users 124 and 125, but communicationally coupled to one another via the network 190. In one embodiment, users that are physically co-located can add themselves to the collaboration, such as for purposes of performing a collaborative search, by simply appearing within the frame being captured by the video camera 111 that is communicationally coupled to a personal computing device that is also physically co-located with those users, such as, for example, the personal computing device 110. Thus, as illustrated by the exemplary system 100 of FIG. 1, the video camera 111 can capture images of the users 121 and 122, and, in one embodiment, the personal computing device 110 can perform facial recognition to identify the users 121 and 122. In other embodiments, the personal computing device 110 can perform other types of pattern recognition to identify the users 121 and 122 such as, for example, voice recognition and other like pattern recognition. Once the users 121 and 122 have been identified by the personal computing device 110, a communication 151 can be sent from the personal computing device 110 to a collaboration component 171, indicating that the users 121 and 122 have joined a collaboration.

In one embodiment, the collaboration component 171 can execute on a server computing device such as, for example, the server computing device 170 that can be different from the personal computing devices, such as the personal computing devices 110, 130 or 140, of the users who are performing a collaborative search. In another embodiment, however, the collaboration component 171 can execute on one or more of the personal computing devices such as, for example, the personal computing devices 110, 130 or 140.

Similarly, in one embodiment, the pattern recognition used to identify users, such as, for example, the facial recognition utilized to recognize users 121 and 122, can be performed by a computing device co-located with those users such as, for example, the personal computing device 110. In such an embodiment, the communication 151 can simply identify the users that have been identified by the personal computing device 110, such as, for example, by a unique user identifying value. In another embodiment, however, the pattern recognition used to identify users can be performed remotely such as, for example, on the collaboration computing device 170. In such an embodiment, the communication 151 can comprise the necessary patterns that can be utilized by the collaboration computing device 170 to perform the requisite pattern recognition, in order to identify the users such as, for example, the users 121 and 122. For example, the communication 151 can comprise still or motion images of the users 121 and 122, such as those captured by the video camera 111, which processes executing on the collaboration computing device 170 can utilize to perform facial recognition and, thereby, identify the users 121 and 122. As another example, the communication 151 can comprise audio data captured from the users 121 and 122, which processes executing on the collaboration computing device 170 can utilize to perform voice recognition and, again, thereby identify the users 121 and 122. Additionally, multiple users can be identified from a single still image, a single collection of motion images, a single set of captured audio data, and the like. In such manners, users, such as the users 121 and 122, can easily identify themselves and add themselves to a collaborative search, without needing to manually enter identifying information, such as a username and password.

In one embodiment, the group of users participating in a collaborative search can be dynamically updated due to users leaving the area that is being visually captured by the video camera 111, or moving into the area that is being visually captured by the video camera 111. For example, the exemplary system 100 of FIG. 1 illustrates a user 123 moving into the area being visually captured by the video camera 111, as illustrated by the movement 129. In response, the personal computing device 110 can utilize the images captured with the video camera 111 to perform a pattern recognition, such as a facial recognition, and, thereby, identify the user 123. The personal computing device 110 can then indicate to the collaboration component 171 that the user 123 has joined the collaboration, such as, for example, via the communication 152 shown in FIG. 1. In another embodiment, as indicated previously, the facial recognition, voice recognition, or other pattern recognition, can be performed by a computing device external to the personal computing device 110, in which case the communication 152 can comprise pattern data from which pattern recognition can be performed in order to identify the user 123.

In determining that a user has joined or left a collaboration, in one embodiment, a delay can be implemented, such that users who are simply out of view for a temporary period of time are not removed from the collaboration. For example, a new user, such as the user 123, moving into the area being visually captured by the video camera 111, can be added as soon as such a user is detected and recognized. Conversely, as another example, a user leaving the area being visually captured by the video camera 111 can be removed from the collaboration only after a period of time has elapsed during which the user has not returned. Such a period of time can be manually adjusted, or can be dynamically adjusted based on empirical observations. Alternatively, users being added to collaborations can, likewise, be added only after a delay, such as to avoid capturing transient users. In yet another embodiment, a one-way mechanism can be implemented, whereby users can be added to a collaboration through the handsfree mechanisms described herein, but can only be removed through a more explicit action, and cannot be removed merely by moving outside of the area being visually captured by the video camera 111, for example. In such an embodiment, an explicit delete functionality can be provided for in a collaboration interface to explicitly remove users that are no longer part of the collaboration.

Users that are not co-located, such as the remotely located users 124 and 125, shown in the exemplary system 100 of FIG. 1, can also join the collaborative search being performed by, for example, the users 121, 122 and 123. To simplify the task of joining such a collaboration, and enable such remotely located users to also join the collaboration in a handsfree manner, such remotely located users can take advantage of the handsfree mechanisms analogous to those described above. For example, the user 124 can be utilizing a tablet computing device 130 that can have a video camera 131 communicationally coupled to it or, more likely, built into it. The video camera 131 can capture images of the user 124 in a manner analogous to the capture of the images of the users 121, 122 by the video camera 111. Similarly, the tablet computing device 130 can perform pattern recognition analogous to that described in detail above with reference to the personal computing device 110. For example, the tablet computing device 130 can perform facial recognition based upon the images captured by the video camera 131 and, thereby, can identify the user 124 and notify the collaboration component 171 that the user 124 seeks to join the collaboration. As another example, the table computing device 130 can perform voice recognition to identify the user 124 and notify the collaboration component 171 that the user 124 seeks to join the collaboration. The communication 161 illustrates such an exemplary notification. In other embodiments, as indicated previously, the tablet computing device 130 can simply transmit, such as to the collaboration computing device 170, sufficient data from which the collaboration computing device 170 can perform pattern recognition to identify the user 124. For example, the tablet computing device 130 can send video, still images, audio, or other like data to enable the collaboration computing device 170 to identify the user 124 through pattern recognition, such as through facial recognition or voice recognition.

The communication 161 can comprise, not only an identification of the user 124, but also the identification of the collaborative search session that the user 124 seeks to join. In one embodiment, the collaboration component 171 can utilize physical proximity to determine which collaborative search session the user 124 seeks to join. For example, users within the same room can be joined to the same collaborative session. In another embodiment, the tablet computing device 130 in the personal computing device 110 can establish a peer to peer communication for purposes of sharing an identifier of a collaborative session. For example, the personal computing device 110 can broadcast an identifier of the collaborative session comprising the users 121, 122 and 123 to other computing devices on the same sub-network. In yet another embodiment, the collaboration component 171 can reference existing friend graphs, such as those described in detail below, to identify potential already-existing collaborative sessions that the user 124 may seek to join. Other mechanisms for identifying the collaborative search session that the user 124 seeks to join can be equally applicable. In instances where multiple such collaborative sessions may be identified, the user 124 can be presented with an option, such as through the display device of the tablet computing device 130, to enable the user 124 to specify which collaborative session they seek to join. Such an explicit user specification can, as can any of the other explicit actions described herein, also be performed in a handsfree manner, such as by speaking the selection or otherwise providing appropriate voice input.

In one embodiment, predefined patterns can be utilized so as to minimize the amount of processing required to perform the relevant pattern recognition. For example, in a corporate context, employees can be issued employee badges with their photograph. Such photographs can then be compiled into a database. Subsequently, if the user 124 seeks to join the collaboration, they can simply hold their corporate employee badge, with their picture, in front of the video camera 131 of the tablet computing device 130. In such an embodiment, the tablet computing device 130, or other computing device, need only compare the picture of the employee from their corporate employee badge, as captured by the video camera 131, with that same picture as saved in the above-referenced database. As will be recognized by those skilled in the art, such a comparison can be more efficient and, consequently, can be performed by computing devices having limited processing capability such as, for example, the tablet computing device 130.

In another embodiment, users can merely perform an action with their computing device and the computing device can transmit an identifier of the user associated with that computing device, or a user currently logged on to such a device. As will be recognized by those skilled in the art, some computing devices such as, for example, the smartphone computing device 140 shown in exemplary system 100 of FIG. 1, can comprise motion detection mechanisms, such as accelerometers, gyroscopes, or other like motion detection mechanisms. Consequently, in such another embodiment, the pattern recognition that can be performed by the smartphone computing device 140 can be pattern recognition based on motion, and, more specifically, a specific type of motion that can trigger the smartphone computing device 140 communicating to the collaboration computing device 170 that the user 125 of the smartphone computing device 140 wishes to join the collaborative search. Such a communication is illustrated by the communication 162 of FIG. 1.

One exemplary motion can be a "fling" motion, or another like throwing motion, whereby the user 125 moves the smartphone computing device 140 in a manner representative of throwing an object. Such a fling motion is illustrated by the motion 141 in the exemplary system 100 of FIG. 1. Other exemplary motions that can be utilized can include simply shaking the smartphone computing device 140, moving the smartphone computing device 140 in a "figure-eight" pattern, moving the computing device in an up-and-down motion, and other like motions. In response to detecting motion, such as the motion 141, the smartphone computing device 140 can perform a pattern recognition to determine that the motion 141 is indicative of the desire, by the user 125, to join the collaborative search. Consequently, the smartphone computing device 140 can communicate, as illustrated by the communication 162, an identifier of the user 125 to the collaboration computing device 170.

In contexts where multiple users may be utilizing a single computing device, the identification of the user seeking to join a collaboration, which can be provided when an appropriate motion of the computing device is detected, such as described in detail above, can be based on a user that is currently logged in to the computing device. In another embodiment, moving a computing device, such as in the manner described in detail above, can trigger an explicit request for a user to join a collaboration, unless the computing device is unaware of which user is making such a request. In such a case, prior to generating an explicit request, the computing device can request further information, such as the identity of the user on whose behalf such a request is to be made. As indicated previously, voice input and other forms of handsfree input can be utilized to respond to such a request.

In a still further embodiment, the generation of an explicit request to join a collaboration can be based on touch input, such as can be input through a touchscreen device of a computing device. More specifically, specific gestures, such as combinations of simultaneous actions by, for example, multiple fingers, can be a pattern that can be recognized through appropriate pattern recognition, and can trigger the above-described requests that a user join a collaboration.

To perform the collaborative search, search terms can be entered by one or more of the users in the collaborative search, such as, for example, one or more of the users 121, 122, 123, 124 and 125. In the exemplary system 100 shown in FIG. 1, one of the users 121, 122 and 123 interacting with the personal computing device 110 can provide the search terms, which the personal computing device 110 can then communicate to the collaboration computing device 170, as illustrated by the communication 152. In another embodiment, the communication 152 can communicate the search terms from the personal computing device 110 directly to the recommendation computing device 180, upon which the recommendation engine 181 is executing. In addition to the search terms, the recommendation engine 181 can also receive the identifiers of the users in the collaborative search, such as from the collaboration component 171, as illustrated by the communication 189. As also illustrated by the communication 189, in another embodiment, rather than being provided with identifiers of the users directly, for user privacy, the recommendation engine 181 can receive only an identification of a specific set of user metadata, such as could be stored in the user database 186.

As will be understood by those skilled in the art, the recommendation engine 181 can have access to a knowledge database 185 that can comprise information of which the recommendation engine 181 is aware, or data the recommendation engine 181 has had collected for it. Typically, the knowledge database 185 comprises information obtained from multiple independent sources such as, for example, information obtained from webpages on the ubiquitous World Wide Web. In addition, the recommendation engine 181 can be communicationally coupled to a user database 186 that can comprise settings, preferences, identifying information, and other like information about one or more users that can utilize the recommendation engine 181. For ease of reference, the term "user metadata" will be utilized herein to refer to settings, preferences, and other like information about a single user. In one embodiment, however, the user metadata can exclude identifying information from which a specific identity of a user could become known. Typically, the information in the user database 186 is explicitly provided by users of the recommendation engine 181 to improve their experience. For example, a user can specify a particular geographic so that the entities identified by the recommendation engine 181, in response to queries from such a user, can be limited to the geographic area specified. As another example, a user can specify preferences that can be utilized to filter various types of searches. For example, the user can specify that searches directed to dining establishments recommend only those dining establishments that meet certain criteria such as, for example, being kid friendly, offering buffet style meals, not exceeding a certain cost per entrée, serving a particular type of cuisine, and other like criteria. In other embodiments, however, user metadata can be inferred from user behavior, such as prior user actions, individuals with whom a user has previously interacted, or is linked to, interests the user searches for, or participates in, and other like user behavior that the user can have given permission to be collected and utilized for the generating the user metadata.

Typically, search terms are received, by the recommendation engine 181, from a single user, and such a user can be identified by the recommendation engine 181 through conventional mechanisms. For example, such a user can log into the recommendation engine 181 through the provision of a username and password, or other like identification and authentication mechanisms, and subsequent searches performed while the user is logged on will be interpreted by the recommendation engine 181 as being performed by that user, and that user's metadata, as obtained from the user database 186, can be applied. The recommendation engine 181, can, in one embodiment, also be capable of performing collaborative searches where the recommendations identified by the recommendation engine 181 are, for example, optimized in accordance with the user metadata of multiple users, which can all be determined from the user database 186. In such an embodiment, the recommendation engine 181 can be provided with an identification of the users, or merely their otherwise anonymous user metadata, who are collaborating to perform the collaborative search. Such identification can be provided by the collaboration component 171, as illustrated by the communication 189. As indicated previously, the search terms could be provided directly to the recommendation engine 181, as illustrated by the communication 155. Conversely, such search terms could initially be provided to the collaboration component, and can then be provided from the collaboration component to the recommendation engine together with the user identifiers, as illustrated by the communications 156 and 188, shown in the exemplary system 100 of FIG. 1.

Figure 2A:
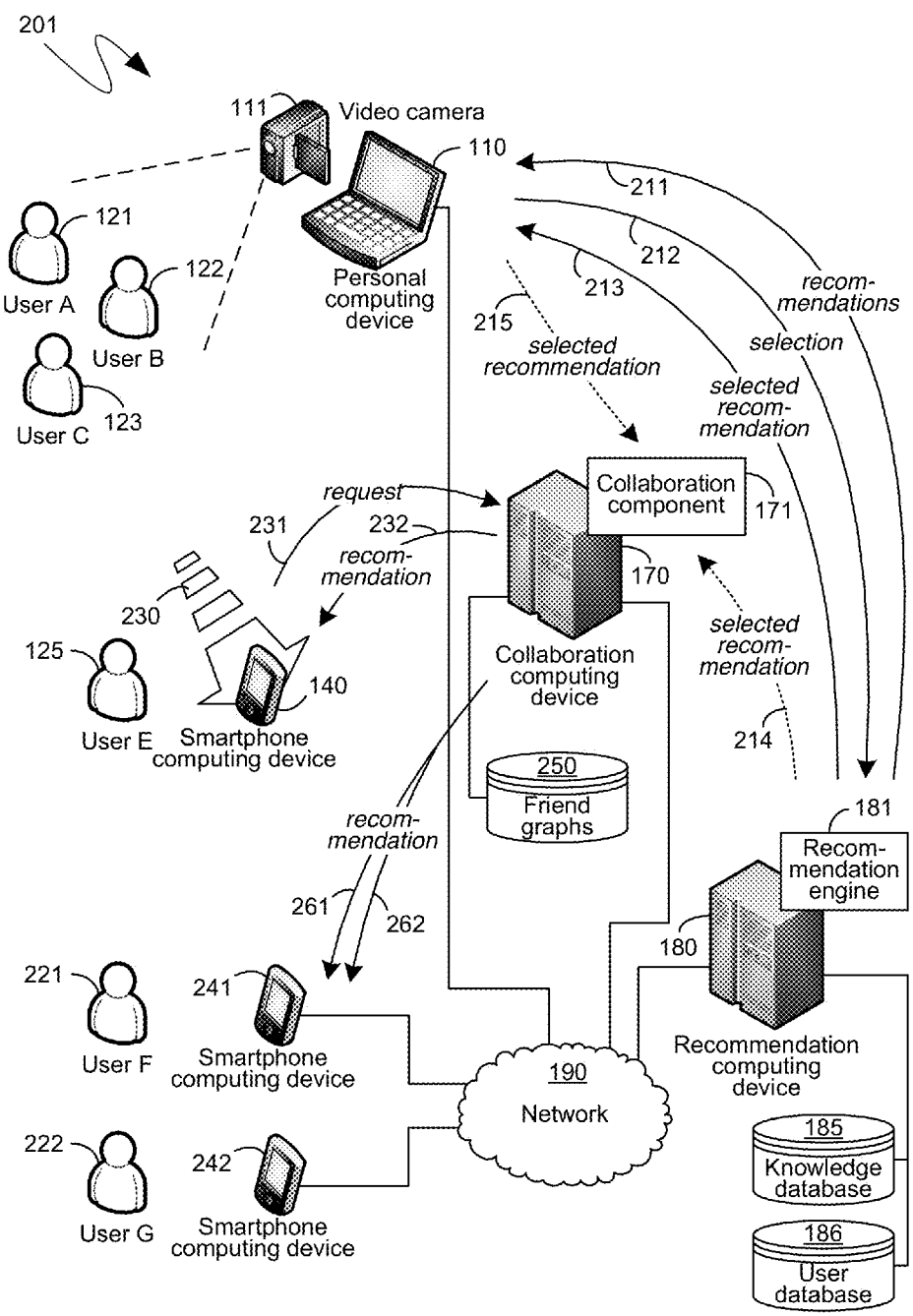
FIGS. 2a and 2b are block diagrams of exemplary systems for providing simplified obtaining of collaborative recommendations through pattern recognition.
Figure 2B:
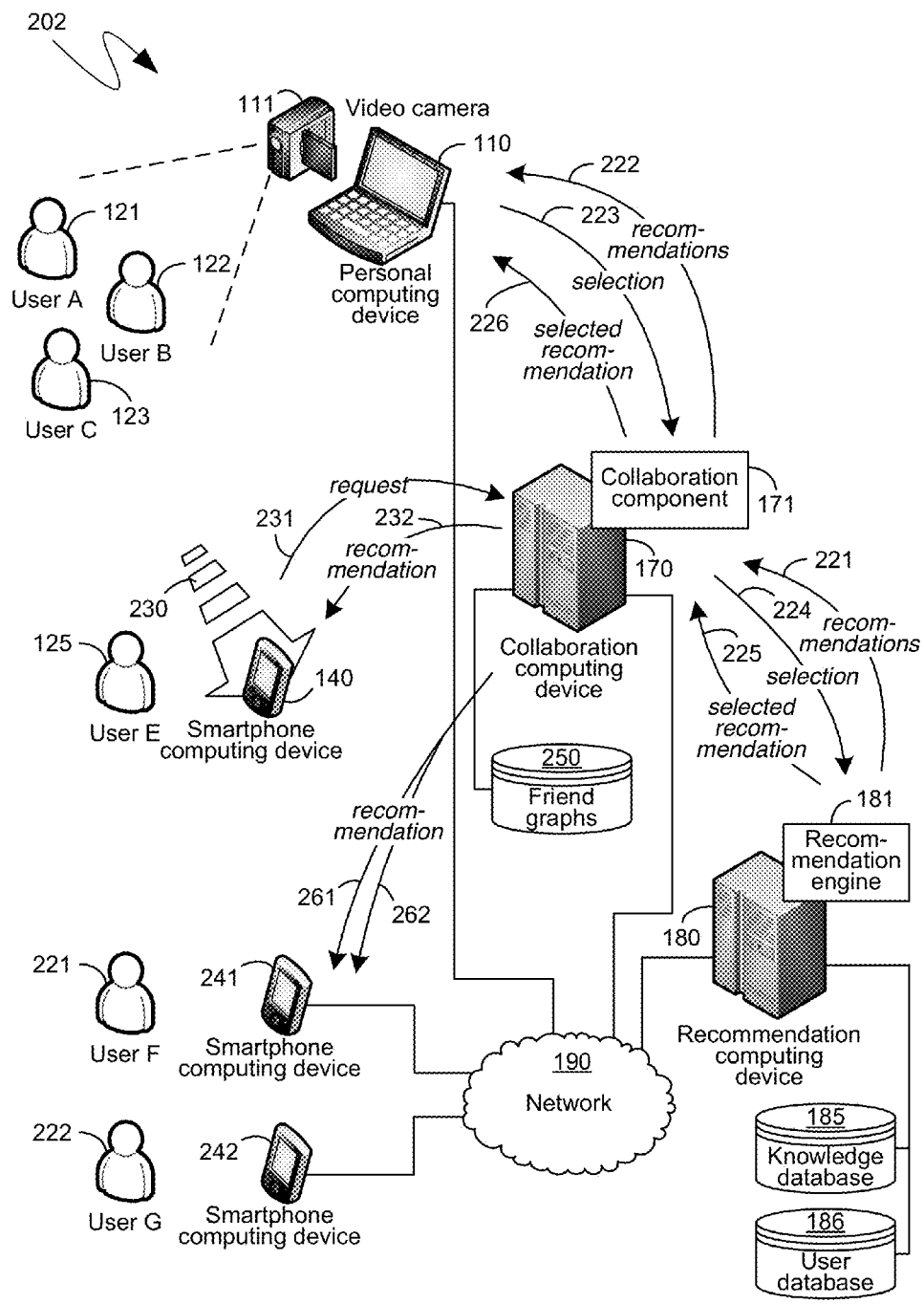

Turning to FIGS. 2a and 2b, the systems 201 and 202 shown therein illustrate two exemplary series of mechanisms by which the recommendations resulting from a collaborative search can be provided to users. Turning first to FIG. 2a, as shown in the system 201, the recommendation engine 181 can generate recommendations and can communicate those recommendations directly to a computing device that was the source of the search terms such as, for example, the personal computing device 110, as illustrated by the communication 211.

Subsequently, in response to receiving recommendations, which, as indicated previously, can have taken into account the user preferences, attributes or settings of the users in the collaborative search, a selection of one or more of the recommendations received via communication 211 can be made. For example, the users performing a collaborative search may have been searching for a restaurant to which to go to lunch. Each user can have stored, such as part of the user database 186, preferences regarding their dining establishments. For example, the user 121 may prefer dining establishments that are inexpensive, while the user 122 may prefer dining establishments that offer buffets, in the user 123 may prefer dining establishments that serve oriental cuisine. In such a simplified example, a collaborative search performed for restaurants by the collaboration of users 121, 122 and 123 could provide recommendations identifying inexpensive oriental buffet restaurants. Upon reviewing such recommendations, such as on the display of the personal computing device 110, the users 121, 122 and 123 may decide to select a particular result, such as a particular inexpensive oriental buffet restaurant. Such a selection can then be communicated to the recommendation engine 181, as illustrated by the communication 212. In response to such a selection, the recommendation engine 181 can provide further information regarding the selection. The provision of such additional information is illustrated in the form of a selected recommendation 213 that can be provided from the recommendation engine 181 to the personal computing device 110, or which can be provided from the collaboration component 171, as described in further detail below. For example, returning to the above examples of restaurants, the recommendation engine 181 can provide detailed information regarding the selected restaurant such as, for example, a map, driving directions, an address and phone number, the hours of operation, which meals are served, selected reviews, a link to the restaurant's website, and other like information. Such information can be part of the selected recommendation 213.

In some instances, depending upon the settings specified by the individual users in the collaboration, the recommendation engine 181 can determine that a single recommendation is substantially more suited to the users performing the collaborative search than any of the other results. For example, returning to the above example, there may exist only one inexpensive oriental buffet restaurant within the geographic region of the users 121, 122 and 123. In such an instance, the recommendation engine 181 can provide the single recommendation, and additional information about such a recommendation, via the communication 211, thereby obviating any need for communications 212 and 213.

Once a selection is made, such a selected recommendation may be shared with other users, including other users in the collaborative search that can have participated in the collaborative search through other computing devices, such as in the manner described in detail above, and also including other users that were not necessarily part of the collaborative search. To share such a selected recommendation, in one embodiment, the collaboration component 171 to be made aware of such a selected recommendation. The collaboration component 171 can either receive the selected recommendation from the personal computing device 110, or the collaboration component 171 can receive the selected recommendation directly from the recommendation engine 181 once the selection is communicated to the recommendation engine via the communication 212. In the exemplary system 201 of FIG. 2a, the communication 215 illustrates the former alternative, while communication 214 illustrates the latter alternative. As they are alternatives of one another, the communications 214 and 215 are illustrated via dashed lines.

Before continuing with the sharing of the selected recommendation among other users, an alternative exchange between the recommendation engine 181, the collaboration component 171, and, for example, the personal computing device 110, is illustrated by the system 202 of FIG. 2b. More specifically, and turning to FIG. 2b, rather than communicating directly with one or more of the users performing the collaborative search, such as through communications directed to the personal computing device 110, the collaboration component 171 can, in an alternative embodiment, act as an intermediary between the recommendation engine 181 and the personal computing device 110. Such an alternative embodiment is illustrated by the system 202 FIG. 2b, where the recommendations generated by the recommendation engine 181 can initially be provided to the collaboration component 171, as illustrated by the communication 221. Subsequently, the collaboration component can then provide the recommendations to a personal computing device of one or more of the users participating in the collaborative search, such as the personal computing device 110. Such a provision of recommendations is illustrated by the communication 222. In response, as described above, one or more of the users interacting with the personal computing device 110 can make a selection, which can be communicated back to the collaboration component 171, as illustrated by the communication 223. The communication component 171 can then communicate such a selection back to the recommendation engine 181, as illustrated by the communication 224. In response, the recommendation engine 181 can provide additional information regarding the selection, such as in the manner described in detail above. Such additional information can be provided from the recommendation engine 181 to the collaboration component 171, as illustrated by the communication 225, and the collaboration component 171 can provide such information to the personal computing device 110 via the communication 226. As before, if the recommendation engine 181 determines that a single recommendation is the most applicable, it can provide such a recommendation directly in response to the search query. In such a case, only communications 225 and 226 need be exchanged.

The subsequent aspects of the system 202 of FIG. 2b, directed to the sharing of the selected recommendation with other users through other computing devices, are identical to those of the system 201 of FIG. 2a, and bear the same identifying numbers. Consequently, the descriptions below are equally applicable to the system 201 FIG. 2a and the system 202 of FIG. 2b.

For users that may not be co-located with the personal computing device 110, the selected recommendation resulting from the collaborative search can be provided to such users in a simplified manner through the use of pattern recognition, thereby enabling such users to receive selected recommendations in a handsfree manner. More particularly, in one embodiment, a user 125 of a smartphone computing device 140 can move the smartphone computing device 140 in such a manner that the motion recognition associates the motion of the smartphone computing device 140 with the desire, by the user 125, to receive the selected recommendation. For example, the user 125 can move the smartphone computing device 140 in a waving motion equivalent to that utilized to signal someone to come over. Such a motion 230 is illustrated in the exemplary system 200 of FIG. 2. Other motions can, likewise, be utilized. For example, the smartphone computing device 140 can be shaken, can be moved in a circular or figure-eight pattern, or other like distinguishable motions. In one embodiment, the motion 230 utilized to indicate a user's desire to receive the collaborative recommendation can be equivalent to the motion 141, described above in connection with FIG. 1, utilized to indicate the user's desire to join the collaborative search session in the first place.

In another embodiment, the pattern recognition utilized to simplify the manner in which a user requests the recommendation can include touch pattern recognition. Thus, in such another embodiment, the user 125 can utilize touch sensitive input peripherals, such as a touch sensitive display of the smartphone computing device 140, and can generate touch input that can be recognized as an explicit request for the recommendation. For example, the user could swipe their finger from the top of the touch sensitive display smartphone computing device 140 to the bottom. Other like touch gestures can, likewise, be associated with an explicit request to receive the recommendation.

In response to the recognition of a pattern, such as a specific motion, or a specific touch input, that can indicate a user's desire to receive the selected recommendation, the smartphone computing device 140 can issue a request 231 to, for example, the collaboration component 171 for the selected recommendation. In response, as illustrated by the communication 232, the collaboration component 171 can provide the selected recommendation to the smartphone computing device 140.

In one embodiment, a user currently participating in a collaborative search can share the selected recommendation with other users that may not have initially participated in the collaborative search. For example, the user 121 can utilize the personal computing device 110 to request that the collaboration component 171 transmit the selected recommendation to a defined set of users such as, for example, users that the user 121 has grouped into a particular category, or has a particular association with. In such an embodiment, the collaboration computing device 170 can comprise one or more friend graphs, which can be stored in a friend graph database 250. As utilized herein, the term "friend graph" means any definition or listing of one or more other users that are associated with a particular user. The friend graph database 250 can, therefore, comprise friend graphs that are explicitly defined by users for purposes of collaborative searching, or it can comprise friend graphs defined by users in other contexts which the collaboration component 171 has been given permission by the users to obtain. For example, such friend graphs can be obtained from social networking services with which one or more of the users performing a collaborative search can be associated.

In such an embodiment, if one user requests that the selected recommendation be provided to other users, then the collaboration component 171 can send such a selected recommendation to other users, for example as is illustrated by the communications 261 and 262 to the user's 221 and 222, respectively, via the smartphone computing devices 241 and 242, respectively. Alternatively, a user preference can be set such that communications analogous to the communications 261 and 262 are automatically generated and transmitted when a user receives a selected recommendation resulting from a collaborative search, such that the selected recommendation is automatically shared with the other users specified by such user preferences. As yet another alternative, users to whom selected recommendations are sent, that were not part of the original collaboration, can be required to perform a further action, such as, for example, a move analogous to the motion 230, in order to receive such recommendations. In such an alternative, users to whom selected recommendations are sent, but who did not wish to receive such selected recommendations, can simply ignore any attendant notification, and the selected recommendation will either not be delivered, not be displayed, or will be erased.

Although the above descriptions, and FIGS. 1 and 2, have illustrated the collaboration component 171 as executing on an independent computing device, such as the collaboration computing device 170, in other embodiments the collaboration component 171 can execute on one or more of the personal computing devices of the users who were collaborating to perform a collaborative search. Thus, for example, the collaboration component 171 can execute on the personal computing device 110. Additionally, in still other embodiments, the collaboration component 171 can be part of the processes executing on the recommendation computing device 180. In such an embodiment, the recommendation computing device 180 can support the above-described mechanisms by which collaborative searches can be performed in a handsfree manner.

In addition to keeping track of the identities of the users currently collaborating to perform a search, the collaboration component 171 can also delineate discrete collaborative search sessions. In one embodiment, the collaboration component 171 can receive information indicating that one or more users have explicitly ended a collaborative search session. In another embodiment, the collaboration component 171 can utilize heuristics to determine when a collaborative search session has ended. For example, if no search terms are transmitted within a predefined period of time, the collaborative search session can be deemed to have ended and, should one or more of the users attempt to perform a collaborative search, a new collaborative search session can be generated. The collaboration component 171 can utilize collaborative search session identifiers to track and maintain such sessions. In another embodiment, the collaboration component 171 can utilize existing collaborative infrastructure to set up and maintain individual sessions. For example, users engaged in a video teleconference can also seek to perform a collaborative search. In such an example, the collaborative search session can end when the video teleconference ends. Additionally, in such an embodiment, data generated as part of the existing collaborative infrastructure can also be utilized to perform the pattern recognition, described in detail above, in order to enable users to participate in collaborative searches in a handsfree manner. For example, returning to the above example of a video teleconference, the video teleconference can provide, not only the framework to distinguish one collaboration from another, but can also provide the video imagery by which users can be recognized and added to the collaborative search, such as by utilizing the facial recognition, or other handsfree mechanisms involving pattern recognition, described in detail above.

Figure 3:
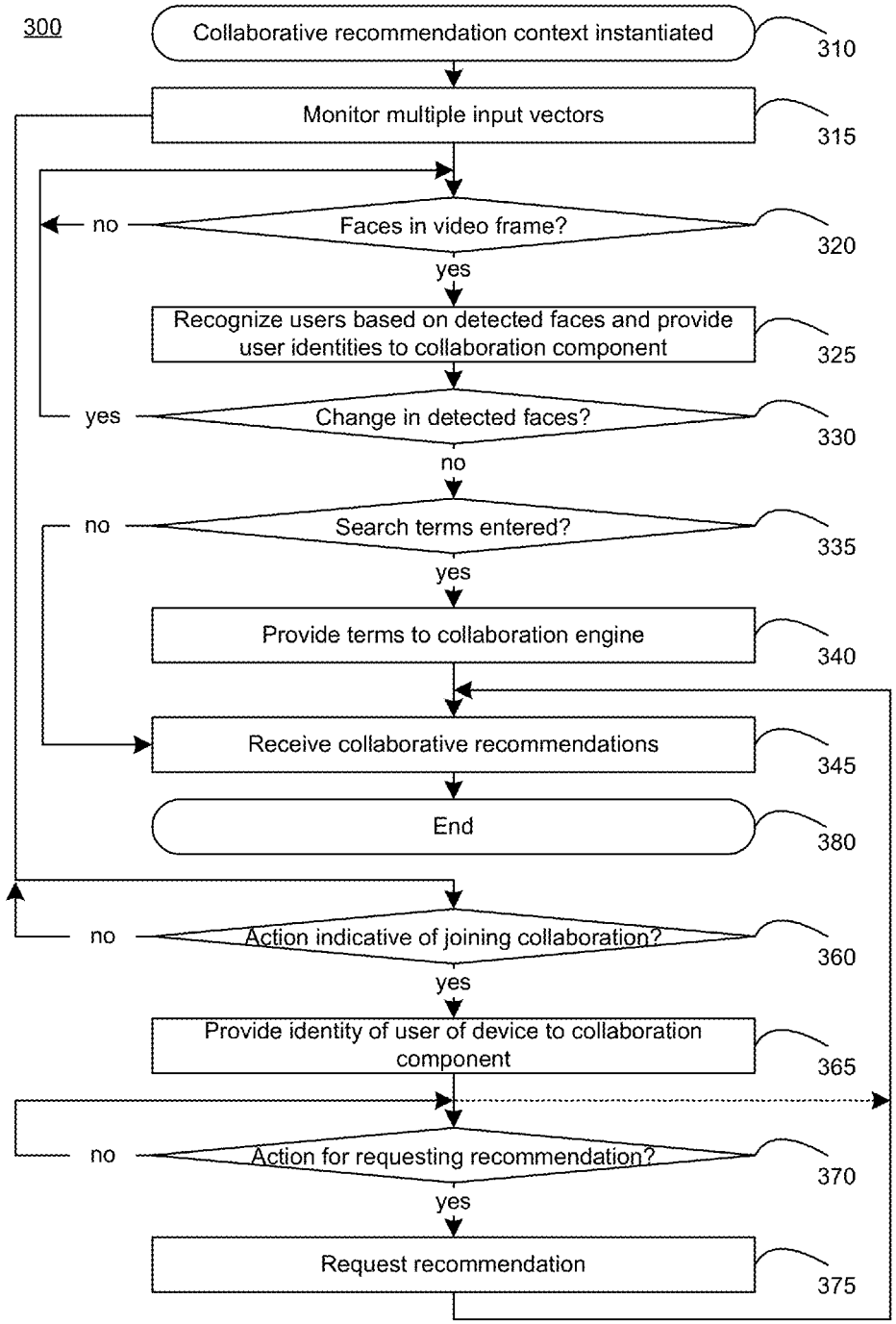
FIG. 3 is a flow diagram of an exemplary providing of simplified collaborative searching through pattern recognition.

Turning to FIG. 3, the flow diagram 300 shown therein illustrates an exemplary series of steps that can be performed by a personal computing device to aid the user in collaborative searching. Initially, at step 310, a collaborative search context can be initiated. In one embodiment, such a collaborative search context can be a dedicated application program that can be executed by personal computing devices including, for example, the personal computing device 110, the tablet computing device 130 and the smartphone computing device 140 that were shown in FIG. 1. In an alternative embodiment, a collaborative search context can be a component, plug-in, extension, or other add-on to an existing application program or operating system being executed by the personal computing devices. For example, the collaborative search context can be a web browser extension and can be instantiated through the web browser. As another example, the collaborative search context can be an extension to an existing application directed to other collaborative contexts, such as video messaging or instant messaging contexts.

In one embodiment, upon instantiation of such a collaborative search context, multiple input vectors can be monitored, or made available for monitoring or the receiving of input, at step 315. One such input vector can be video input, in which case processing can proceed to step 320. Another input vector can be motion recognition, in which case processing can proceed to step 360. Other input vectors are equally applicable to providing handsfree mechanisms by which the user can join and participate in collaborative searches, as described in detail above, but are not explicitly illustrated in the flow diagram 300 of FIG. 3 to maintain visual clarity. Turning first to video input, processing can proceed with step 320 where faces can be sought for in the video being captured by a video camera. If one or more faces are detected, processing can proceed to step 325. Subsequently, at step 325, users can be identified based on facial recognition, and the identification of such users can be provided to a collaboration component. As indicated previously, such a collaboration component may be executing on a different computing device or it may be executing concurrently with the collaborative search context on the same computing device. Additionally, although not specifically enumerated in the exemplary flow diagram 300, steps 320 and 325 can be equally applicable to any other type of pattern recognition. For example, at step 320 a microphone could be utilized to detect voices, and at step 325 users could be identified based upon voice recognition. Other types of pattern recognition enumerated above are also equally applicable.

At step 330, a determination can be made as to whether there is a change in the patterns being recognized, such as if a new user has walked into the video frame being captured by the video camera, a new user's voice is being recorded on the microphone, or other like changes. If such changes are detected, at step 330, processing can loop back to steps 320 and 325 and, thereby, continually update the users that are collaborating to perform a collaborative search. As indicated previously, in some embodiments, a delay can be implemented after detecting a change in the faces at step 330. At step 335 a determination can be made as to whether search terms have been entered. If search terms have been entered, as determined at step 335, then such search terms can be provided to the recommendation engine at step 340 if they were not directly sent to the recommendation engine initially. As described in detail above, collaborative recommendations can be received in response to the search terms provided at step 340. If the recommendation engine determines that a single result is most applicable, or is substantially more applicable in other results, it can provide a single recommendation, such as that received at step 345. Alternatively, the recommendation engine can provide a series of recommendations to a computing device of one of the users in the collaborative search, such as the computing device from which the search terms were received, and a user interacting with such a computing device can select one or more of the recommendations as a selected recommendation. For simplicity and ease of graphical presentation, such an exchange of recommendations, a subsequent selection, and the subsequent provision of additional information directed to the selection, in the form of a selected recommendation, is not explicitly shown in the flow diagram 300 of FIG. 3, and is instead encapsulated within step 345. Once additional information in the form of a recommendation is received, the relevant processing can end at step 380.

Returning back to step 335, if, at step 335, no search terms are entered, the collaborative search context that was instantiated at step 310 may not be the context through which the search terms are being entered. For example, the collaborative search context instantiated at step 310 can be executing on a tablet computing device, thereby enabling one or more users co-located with the tablet computing device to collaborate with other users, such as other users utilizing a personal computing device. In such an instance, those other users may enter the search terms for the collaborative search via the personal computing device, as opposed to the tablet computing device. Consequently, if, at step 335, no search terms are detected, processing can proceed to step 345 to receive the recommendation. The relevant processing can then end at step 380.

As indicated at step 315, multiple input vectors can be monitored. Another such input vector can be motion input, in which case processing can proceed with step 360, instead of step 320, at which point a determination can be made as to whether there has been an action indicative of joining the collaboration. As indicated previously, in performing step 360, a computing device can utilize pattern recognition to simplify the task of joining a collaboration. For example, at step 360, a determination can be made as to whether the computing device has been moved by the user in a manner indicative of joining the collaboration. Such motion recognition can be informed by various sensors on the computing device. As another example, at step 360, a determination can be made as to whether the user has provided touch input indicative of joining the collaboration, such as that described in detail above.

Once action indicative of joining a collaboration is detected, at step 360, processing can proceed to step 365, at which point the identity of the user of the computing device can be provided to a collaboration component. As indicated previously, the identity of the user of the computing device can be the identity of a user that is currently logged on to the computing device. Alternatively, as part of the instantiation of the collaborative search context, such as at step 310, user's identity can be requested from the user, or such an explicit request can be made in response to a determined, such as at step 360, that an action indicative of joining the collaboration was detected. As described above, the user's response to such an explicit request can also be handsfree, such as through voice input.

In one embodiment, after step 365 processing can proceed to step 345 and await the collaborative recommendation. In such an embodiment, a user joining the collaboration, even from a remote device, such as the smartphone computing device, can still automatically receive the collaborative recommendation without further action on the part of the user.

In another embodiment, however, after step 365, a decision can be made, at step 370, as to whether the user has performed an action indicative of requesting the collaborative recommendation. In such other embodiment, the collaborative recommendation may not be automatically provided. Instead, at step 370, pattern recognition can be utilized, much in the same way as in step 360, to simplify the user's task of explicitly requesting the collaborative recommendation. For example, motion detection and recognition of motion patterns can be utilized such that when the user moves the computing device in a particular manner, such as those detailed above, such motion can be interpreted as an action indicative of requesting the collaborative recommendation. If such a motion is detected, then processing can proceed to step 375, at which point the computing device can issue an explicit request for the collaborative recommendation. Processing can then proceed to step 345 to receive the requested recommendation, and, ultimately, the relevant processing can end at step 380.

Figure 4:
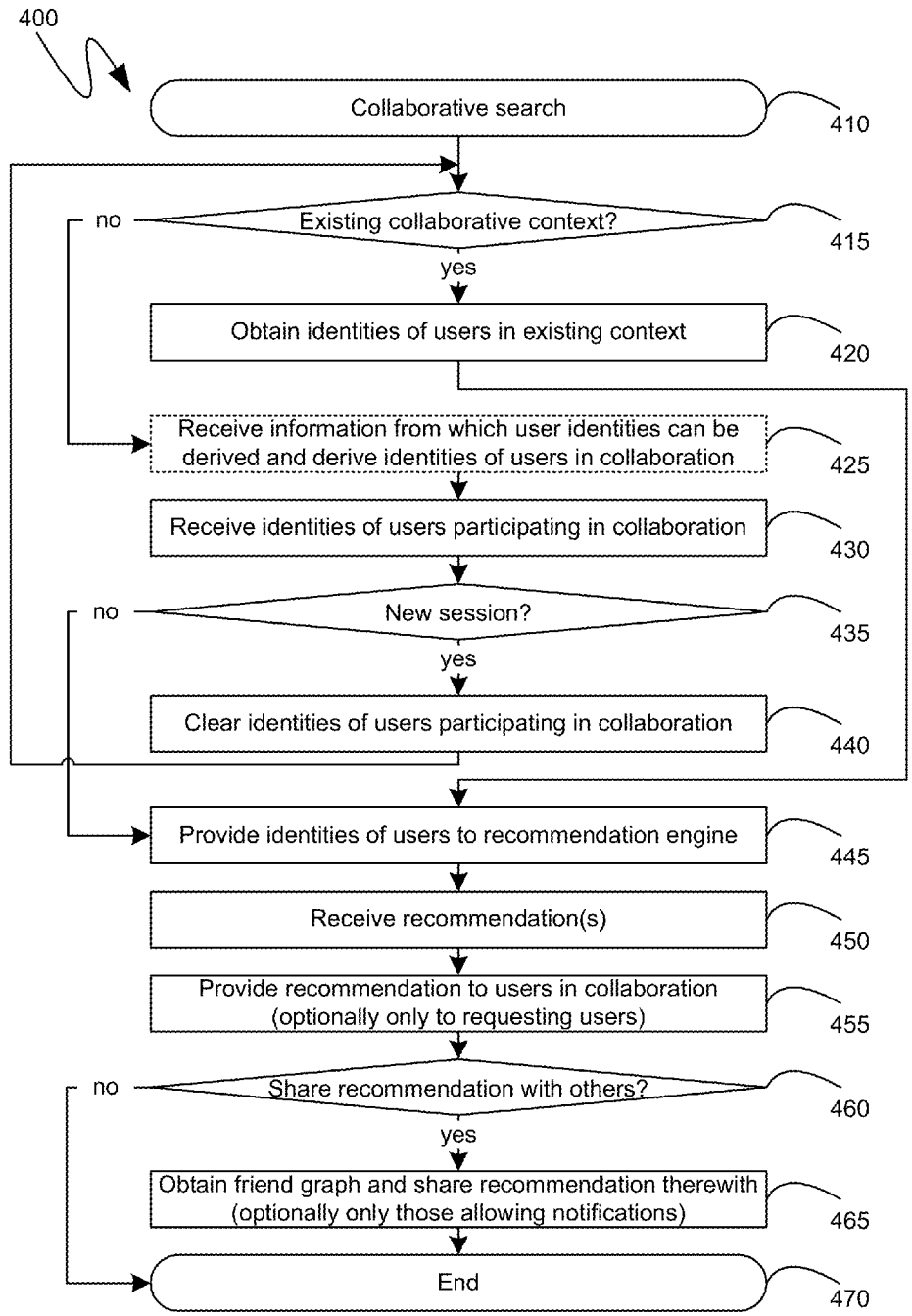
FIG. 4 is a flow diagram of an exemplary collaborative searching session.

Turning to FIG. 4, the exemplary flow diagram 400 shown therein illustrates an exemplary series of steps that can be performed by a collaboration component or other like mechanism facilitating collaborative searching. Initially, at step 410, such a collaborative search mechanism can be initiated, such as on a server computing device, or as part of an application program, plug-in, extension, or other like mechanism executing on one or more client computing devices. Subsequently, at step 415, a determination can be made as to whether the collaborative search is being performed as part of an existing collaborative context. For example, and as indicated previously, a collaborative search can be performed by users that are already collaborating within a video teleconference, a group instant messaging session, or other like collaborative contexts. In such instances, the mechanisms providing the video teleconferencing functionality, the group instant messaging functionality, or other like collaborative functionalities can already provide an existing collaborative context or framework that can track the users in the collaboration as, for example, existing users leave and as new users are added, and can also determine when such a collaborative session starts, and when it ends. Consequently, if, at step 415, the collaborative search is being performed as part of an existing contextual framework, then, at step 420, the identities of the users in that existing collaborative context can be obtained. Processing can then proceed with step 445, which will be described in further detail below.

Conversely, if, at step 415, there is no existing collaborative context, then processing can proceed to step 430, where the identities of the users that are collaborating with one another can be obtained. For example, the identities can be received from individual computing devices with which the users in the collaboration are interacting, such as in the manner described in detail above. Optionally, rather than receiving the identities directly, information can be received from which the identities can be derived. More specifically, and as illustrated by the optional step 425, pattern data can be received to which pattern recognition can be applied to identify specific users in the collaboration. For example, still images or video clips can be received to which facial recognition can be applied to identify the users in those images or video clips. As another example, audio can be received to which voice recognition can be applied to identify users speaking in the audio clip. Once such pattern recognition is performed, as part of the optional step 425, processing can proceed to step 430 at which point the identities of the users identified at step 425 can be received. Alternatively, processing can proceed directly to step 430 and the identities of the users participating the collaboration can be received from personal computing devices that may have, themselves, performed the pattern recognition.

At step 435, session management determinations can be made such as, for example, whether a new session is to be generated, or an old session terminated. For ease of illustration and description, only a single session at a time is being described and illustrated by the exemplary flow diagram 400 of FIG. 4. However, as will be recognized by those skilled in the art, multiple concurrent sessions, with different groups of users performing independent collaborative searches, can be implemented in a straightforward manner from the descriptions provided herein. In performing step 435, heuristic analyses can be applied to identify when an old session is no longer applicable, or should be ended. For example, if no search terms have been provided for an extended period of time, an existing collaborative context can be ended, and a new session can be started, such as at step 440, by clearing the identities of the users participating in the prior collaborative session and then returning to step 415. As another example, if none of the users that originated the collaborative context remained, a determination can be made to generate a new session, at step 435, and processing can proceed to step 440 and clear the identities of the current users and start again with the execution of step 415.

Conversely, if, at step 435, heuristic analysis reveals that the current session has not yet ended, processing can proceed to step 445 where the identities of the users participating in the collaborative session can be provided to a recommendation engine. As indicated previously, in one embodiment, a collaboration component can be part of a framework provided by a recommendation engine and, as such, step 445 may be nothing more than the recommendation engine merely accessing a data store of the collaboration component in which the identities of the users are temporarily retained. At step 450 the collaborative recommendation can be received. More specifically, and as described in detail above, in one embodiment, the recommendation engine and a computing device being utilized by one of the users performing the collaborative search can communicate directly and can merely provide the selected recommendation, to the collaboration component. In another embodiment, communications between the recommendation engine and the users performing the collaborative search can be directed through the collaboration component. For simplicity and clarity of graphical presentation, step 450 is meant to encompass either the exchange of recommendations, a selection thereof, and additional information of a selected recommendation, or, alternatively, simply the selected recommendation that has already been selected. Subsequently, at step 455, the collaborative search recommendation received at step 450, can be provided to various computing devices being utilized by users who are collaborating together in the collaborative search context. As indicated previously, in one embodiment, the recommendation may be provided to at least one computing device automatically, namely the computing device from whom the search terms were received. In an analogous embodiment, the recommendation can be provided to such a computing device directly by the recommendation engine, instead of by the performance of step 455. As also indicated previously, in one embodiment, step 455 can provide the recommendation only to those users that explicitly request such a recommendation. For example, a user with a smartphone computing device, by moving the smartphone computing device in a manner that is indicative of a desire to receive the collaborative search recommendation.

At step 460, a determination can be made as to whether a request to share the recommendation with other users has been received. Such a request can, in one embodiment, be a standing user preference to, for example, share recommendations with a select group of users. In another embodiment, such a request can be an explicit request to share the particular recommendation that was received with a preselected group of users, or with an explicitly identified set of users. If no such request to share the recommendation with others is received, at step 460, the relevant processing can end at step 470. Conversely, if, at step 460, it is determined that the recommendation received at step 450 is to be shared with other users, processing can proceed to step 465 where the recommendation can be transmitted to such other users. In one embodiment, the execution of step 465 can also entail the obtaining of a friend graph, or other like data identifying users that are relevant to, or associated with, one or more users currently in the collaborative context. Once the recommendation has been shared, at step 465, the relevant processing can end at step 470.

Figure 5:
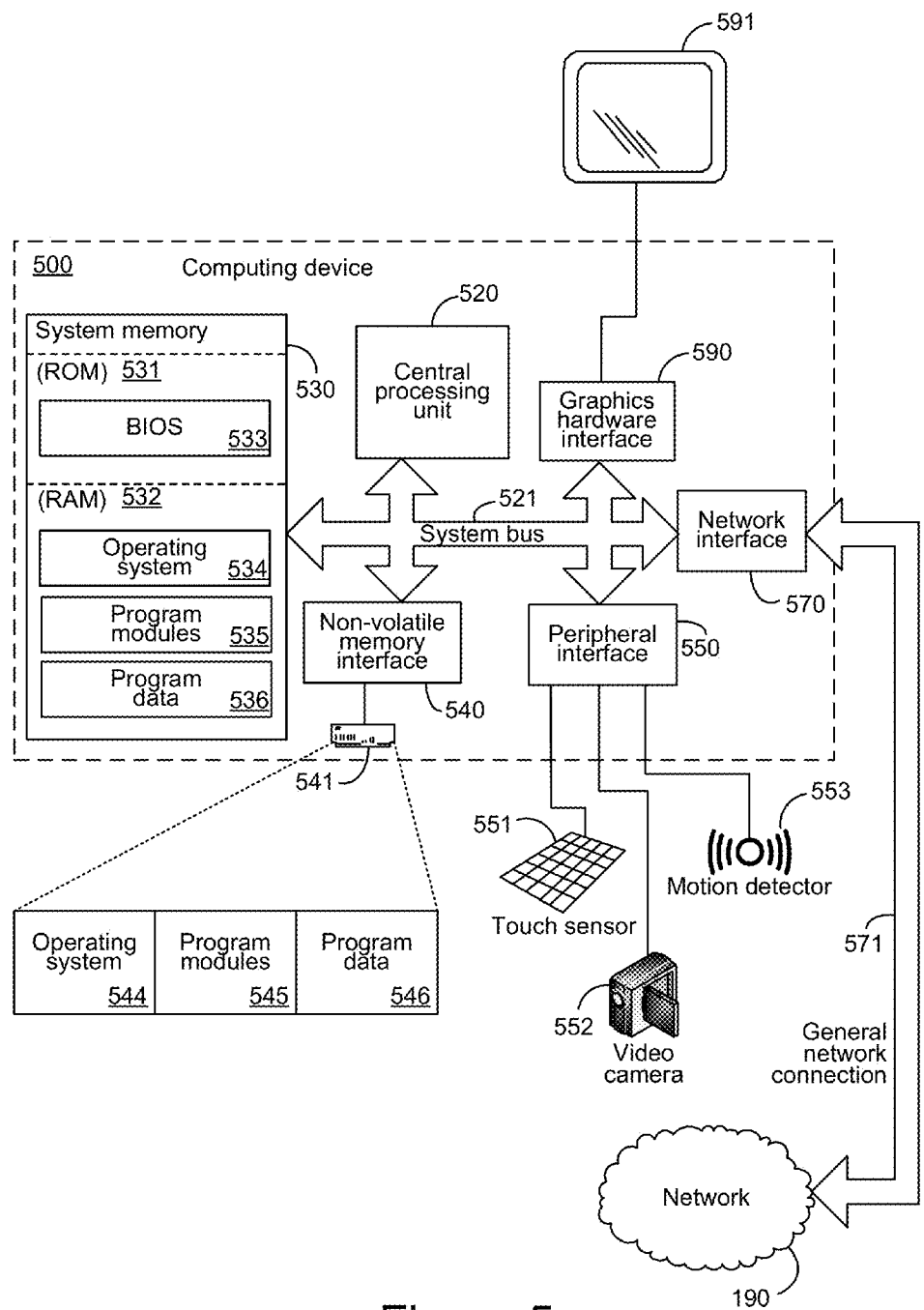
FIG. 5 is a block diagram of an exemplary computing device.

Turning to FIG. 5, an exemplary computing device 500 is illustrated upon which, and in conjunction with which, the above-described mechanisms can be implemented. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of visual user interfaces, including, but not limited to, a graphics hardware interface 590 and a display device 591. Additionally, the computing device 500 can also include user interface input hardware such as a touch sensor 551, a video camera 552, a motion detector 553, which can be implemented through the use of one or more accelerometers, and other like user interface input hardware. The input hardware can be communicationally coupled to the system bus 521 via a peripheral interface 550. In some cases the input hardware may be co-located with other aspects of the computing device 500. For example, in a handheld or tablet configuration, the computing device 500 may comprise a display device 591 integrated with a touch sensor 551 such that the location of a touch on the touch sensor 551 can be correlated with one or more graphical user interface elements that may be displayed in the same location by the display device 591.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, solid state storage media or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536.

The computing device 500 may also include other removable/non-removable, volatile/nonvolatile computer storage media. By way of example only, FIG. 5 illustrates the hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, other solid state storage devices and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment, represented by the network 190, using logical connections to one or more remote computers. The computing device 500 is illustrated as being connected to the general network connection 571 through a network interface or adapter 570, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

As can be seen from the above descriptions, mechanisms for simplifying collaborative searching, by using pattern recognition, have been enumerated. In view of the many possible variations of the subject matter described herein, we claim as our invention all such embodiments as may come within the scope of the following claims and equivalents thereto.

We claim:

1. A method for performing collaborative network searching, the method comprising:
    performing pattern recognition to determine that multiple users seek to participate in a collaborative network search session, the performing the pattern recognition comprising detecting multiple human faces in an image or video of a single physical area;
    determining, with the performed pattern recognition, an identity of at least two of the multiple users, the determining the at least two of the multiple users comprising performing facial recognition on the detected multiple human faces;
    transmitting search terms and at least one of: the determined identity of the at least two of the multiple users or user metadata of the at least two of the multiple users;
    receiving collaborative recommendations in accordance with user metadata of each of the multiple users participating in the collaborative network search session detecting a first change in a quantity of the detected human faces;
    performing the pattern recognition again, in response to the detecting the first change, to determine an identity of a new user when the first change was an increase in the quantity of the detected human faces; and
    automatically updating the collaborative network search session to include the new user when the first change was the increase in the quantity of the detected human faces or automatically updating the collaborative network search session to exclude one of the at least two of the multiple users whose identity was determined with the pattern recognition when the first change was a decrease in the quantity of the detected human faces.

2. The method of claim 1, wherein performing the pattern recognition further comprises:
    detecting a motion of a computing device being utilized by a first one of the multiple users;

determining that the detected motion is equivalent to a first motion that was pre-defined to be indicative of a request to join a collaborative search; and selecting, in response to the detecting and the determining, a second one of the multiple users with which to establish the collaborative search session.

3. The method of claim 2, wherein the selecting the second one of the multiple users with which to establish the collaborative search session comprises receiving a broadcast of an identifier of the collaborative search session, the broadcast being across a geographically limited sub-network to which the computing device is communicationally coupled.

4. The method of claim 2, further comprising: establishing a direct peer-to-peer communicational connection between the computing device and another computing device being utilized by the second one of the multiple users, the collaborative search session being performed across the established direct peer-to-peer communicational connection.

5. The method of claim 2, wherein the selecting the second one of the multiple users with which to establish the collaborative search session comprises referencing a list of other users pre-associated with the first one of the multiple users, the other users comprising the second one of the multiple users.

6. The method of claim 2, wherein the determining the identity of the first one of the multiple users comprises identifying, in response to the detecting the motion and the determining that the detected motion is equivalent to the first motion, a user with which the computing device was pre-associated.

7. The method of claim 1, further comprising:
delaying the automatically updating the collaborative network search session for a predetermined amount of time; and
not performing the automatically updating when, during the predetermined amount of time, a second change is detected in the quantity of the detected human faces in the video such that a new set of multiple users determined to be participating in the collaborative network search session after the second change are equivalent to the multiple users determined to be participating in the collaborative network search session prior to the first change.

8. A system for enabling collaborative searching, the system comprising:
a first computing device comprising computer-executable instructions for:
performing pattern recognition to determine that a first user and a second user seek to participate in a collaborative network search session, the performing the pattern recognition comprising detecting faces of the first and second users in an image or video of a single physical area;
determining, with the performed pattern recognition, an identity of the first user and the second user, the first and second users being proximate to the first computing device, the determining the identity of the first and second users comprising performing facial recognition on the detected faces;
detecting a first change in a quantity of the detected faces;
performing the pattern recognition again, in response to the detecting the first change, to determine an identity of a new user when the first change was an increase in the quantity of the detected human faces; and
automatically updating the collaborative network search session to include the new user when the first change was the increase in the quantity of the detected human faces or automatically updating the collaborative network search session to exclude one of the first or second users when the first change was a decrease in the quantity of the detected human faces;

a second computing device, physically distinct from the first computing device, the second computing device comprising computer-executable instructions for performing pattern recognition to determine that at least one additional user seeks to join the collaborative network search session; and a computer-readable medium comprising computer-executable instructions for:
establishing the collaborative network search session;
adding the first user, the second user and the at least one additional user to the collaborative network search session; and
providing identifiers of users in the collaborative network search session to a search engine.

9. The system of claim 8, further comprising a collaboration computing device, physically distinct from the first computing device and the second computing device, the collaboration computing device comprising the computer-readable medium.

10. The system of claim 8, wherein the pattern recognition performed by the computer-executable instructions of the second computing device comprises motion recognition of physical motions of the second computing device, caused by the at least one additional user, as being equivalent to a first motion that was pre-defined to be indicative of a request to join a collaborative search.

11. The system of claim 8, wherein the first computing device further comprises: a video camera capturing a video and further computer-executable instructions for monitoring the captured video to detect human faces and provide updates either adding or removing users from the collaborative network search session in accordance with the monitoring.

12. The system of claim 8, wherein the computer-readable medium comprises further computer-executable instructions for:
establishing a second collaborative network search session independent of the collaborative network search session;
assigning a unique identifier to each of the collaborative network search session and the second collaborative network search session; and
heuristically determining to end the collaborative network search session.

13. The system of claim 8, wherein the computer-readable medium comprises further computer-executable instructions for:
receiving a collaborative recommendation as a result of the collaborative network search session; and
transmitting, to the second computing device, the received collaborative recommendation.

14. The system of claim 13, wherein the transmitting the received collaborative recommendation to the second computing device is only performed in response to an explicit request for the collaborative recommendation; and wherein further the second computing device comprises further computer-executable instructions for performing motion recognition of the physical motions of the second computing device, caused by the at least one additional user, as being equivalent to a second motion that was pre-defined to be indicative of a request to receive the collaborative search recommendation.

15. The system of claim 8, wherein the computer-readable medium comprises further computer-executable instructions for:
   receiving a collaborative recommendation as a result of the collaborative network search session;
   receiving a request from a requesting user, the requesting user being one of the first user or the at least one additional user, to transmit the collaborative recommendation to a set of users that have been previously associated with the requesting user.

16. The system of claim 8, wherein the collaborative search session is established based upon an existing collaborative context already comprising the first user and the at least one additional user, the existing collaborative context differing from the collaborative search session.

17. A method for performing collaborative network searching, the method comprising:
   performing pattern recognition to determine that multiple users seek to participate in a collaborative network search session, the performing the pattern recognition comprising detecting multiple human voices within a same physical area;
   determining, with the performed pattern recognition, an identity of at least two of the multiple users, the determining the at least two of the multiple users comprising performing voice recognition on the detected multiple human voices;
   transmitting search terms and at least one of: the determined identity of the at least two of the multiple users or user metadata of the at least two of the multiple users;
   receiving collaborative recommendations in accordance with user metadata of each of the multiple users participating in the collaborative network search session;
   detecting a first change in a quantity of the detected human voices;
   performing the pattern recognition again, in response to the detecting the first change, to determine an identity of a new user when the first change was an increase in the quantity of the detected human voices; and
   automatically updating the collaborative network search session to include the new user when the first change was the increase in the quantity of the detected human voices.

18. The method of claim 17, wherein performing the pattern recognition further comprises:
   detecting a motion of a computing device being utilized by a first one of the multiple users;
   determining that the detected motion is equivalent to a first motion that was pre-defined to be indicative of a request to join a collaborative search; and
   selecting, in response to the detecting and the determining, a second one of the multiple users with which to establish the collaborative search session.

19. The method of claim 18, wherein the selecting the second one of the multiple users with which to establish the collaborative search session comprises receiving a broadcast of an identifier of the collaborative search session, the broadcast being across a geographically limited sub-network to which the computing device is communicationally coupled.

20. The method of claim 18, further comprising: establishing a direct peer-to-peer communicational connection between the computing device and another computing device being utilized by the second one of the multiple users, the collaborative search session being performed across the established direct peer-to-peer communicational connection.

* * * * *